(12) United States Patent
Zuo (10) Patent No.: US 10,752,313 B2
(45) Date of Patent: Aug. 25, 2020

(54) ELECTRICAL SELF-BALANCING SCOOTER

(71) Applicant: CHANGZHOU AIRWHEEL TECHNOLOGY CO., LTD. (CN), Jiangsu (CN)

(72) Inventor: Guogang Zuo, Jiangsu (CN)

(73) Assignee: CHANGZHOU AIRWHEEL TECHNOLOGY CO., LTD. (CN), Jiangsu (CN)

( * ) Notice: Subject to any disclaimer, the term of this patent is extended or adjusted under 35 U.S.C. 154(b) by 324 days.

(21) Appl. No.: 15/575,310

(22) PCT Filed: Mar. 30, 2016

(86) PCT No.: PCT/CN2016/077859
§ 371 (c)(1),
(2) Date: Nov. 17, 2017

(87) PCT Pub. No.: WO2016/184262
PCT Pub. Date: Nov. 24, 2016

(65) Prior Publication Data
US 2018/0154971 A1 Jun. 7, 2018

(30) Foreign Application Priority Data
May 20, 2015 (CN) .......................... 2015 1 0259820

(51) Int. Cl.
*B62K 11/14* (2006.01)
*B62K 11/00* (2006.01)
(Continued)

(52) U.S. Cl.
CPC .............. *B62K 11/007* (2016.11); *B62H 1/02* (2013.01); *B62J 25/00* (2013.01); *B62K 3/00* (2013.01);
(Continued)

(58) Field of Classification Search
CPC ........ B62K 11/007; B62K 3/00; B62K 11/00; B62K 11/02; B62K 11/04; B62K 11/06;
(Continued)

(56) References Cited

U.S. PATENT DOCUMENTS 6,320,284 B1 * 11/2001 Fontana ................. G05G 9/047
310/12.04
6,581,714 B1 6/2003 Kamen et al.
(Continued)

FOREIGN PATENT DOCUMENTS

| CN | 2818300 | 9/2006 |
| CN | 101565073 | 10/2009 |

(Continued)

OTHER PUBLICATIONS

China Office Action for corresponding Chinese Patent Application No. 201510259820.7 dated Oct. 8, 2016, 7 pages.
(Continued)

*Primary Examiner* — Jacob D Knutson
(74) *Attorney, Agent, or Firm* — Lee & Hayes, P.C.

(57) ABSTRACT

The present application provides an electrical self-balancing scooter, comprising two wheels mounted on a wheel shaft, and a support frame located between the two wheels, wherein, the support frame comprises a bar mounted on the wheel shaft, whith a handle part mounted on an upper end of the bar through a rotation mechanism, the rotation mechanism comprises a stator mounted on the bar and a rotor that is rotable relative to the stator, the handle part is fixed on the rotor, the rotation mechanism is provided with an angle measurement device to measure a rotation angle of the rotor.

7 Claims, 9 Drawing Sheets

(51) Int. Cl.
  *B62K 11/02* (2006.01)
  *B62K 21/00* (2006.01)
  *B62K 11/06* (2006.01)
  *B62H 1/02* (2006.01)
  *B62J 25/00* (2020.01)
  *B62K 3/00* (2006.01)
  *B62K 11/04* (2006.01)
  *B62M 7/12* (2006.01)
  *B62J 45/415* (2020.01)

(52) U.S. Cl.
  CPC .............. *B62K 11/00* (2013.01); *B62K 11/02* (2013.01); *B62K 11/04* (2013.01); *B62K 11/06* (2013.01); *B62K 11/14* (2013.01); *B62K 21/00* (2013.01); *B62M 7/12* (2013.01); *B62J 45/4152* (2020.02); *B62K 2202/00* (2013.01)

(58) Field of Classification Search
  CPC . B62K 11/14; B62K 21/00; B62H 1/02; B62J 25/00; B62M 7/12
  USPC ........................................................ 180/218
  See application file for complete search history.

(56) References Cited

U.S. PATENT DOCUMENTS

| | | | | |
|---|---|---|---|---|
| 2002/0005315 A1* | 1/2002 | Kind | ...................... | B62D 5/005 180/444 |
| 2006/0048995 A1* | 3/2006 | Kanayama | .......... | B60R 13/0256 180/443 |
| 2007/0158117 A1 | 7/2007 | Alexander | | |
| 2008/0001374 A1 | 1/2008 | Liao | | |
| 2010/0126299 A1* | 5/2010 | Baldassari | ............. | B62K 23/04 74/491 |
| 2011/0036196 A1* | 2/2011 | Menghini | ............. | B62K 23/04 74/488 |
| 2012/0035809 A1 | 2/2012 | Kosaka | | |
| 2013/0098694 A1 | 4/2013 | Gulak | | |
| 2013/0228385 A1 | 9/2013 | Chen | | |
| 2016/0315521 A1* | 10/2016 | Gimlan | ................ | H02K 7/1853 |
| 2017/0165846 A1* | 6/2017 | Bell | .................... | B25J 15/0608 |
| 2017/0233024 A1* | 8/2017 | Zuo | ...................... | B62K 11/007 180/208 |
| 2017/0253287 A1* | 9/2017 | Zuo | ........................ | H02K 33/00 |

FOREIGN PATENT DOCUMENTS

| | | |
|---|---|---|
| CN | 101870315 | 10/2010 |
| CN | 202641971 | 1/2013 |
| CN | 103661723 | 3/2014 |
| CN | 203581249 | 5/2014 |
| CN | 204056181 | 12/2014 |
| CN | 204150152 | 2/2015 |
| CN | 204184517 | 3/2015 |
| CN | 204659898 | 9/2015 |
| CN | 204659914 | 9/2015 |
| CN | 104828188 | 3/2017 |
| DE | 202007004010 | 7/2008 |

OTHER PUBLICATIONS

EP partial supplementary Search Report for corresponding EP patent application No. 16795749.7 dated Jun. 18, 2013, 16 pages.
PCT Search Report from corresponding PCT International Application No. PCT/CN2016/077859 dated Jul. 6, 2016, 8 pages.

* cited by examiner

ELECTRICAL SELF-BALANCING SCOOTER

This Application is a 371 national phase application of international application number PCT/CN2016/077859, which claims priority to application number 201510259820.7, filed in China on May 20, 2015, which is incorporated herein by reference.

TECHNICAL FIELD

The present invention relates to a riding tool, and in particular relates to an electrical self-balancing scooter.

BACKGROUND

An early prototype of self-balancing scooter is a personal riding tool with two wheels on the left and right, which was provided by Segway Company. It is based on sensing by a gyroscope, driven by an electrical motor and controlled by a circuit, so as to keep balance with only two wheels. The running of this type of self-balancing scooter is controlled by the movement of the gravity center of a user, which brings brand new riding experience to the user. When it is formally put on the market in 2002, it is welcomed significantly by many users, and although it is sold at a high price, people still want to buy it.

After development for more than ten years, the self-balancing scooters on the market have gained remarkable advancement and breakthrough as compared to earlier products, and are especially quite mature on the aspects of gravity sensing, driving motor and controlling. The types and styles of self-balancing scooters have also diversified.

However, for assembling and repairing, the inconvenience of assembling and disassembling is a problem that manufactures have to face. Meanwhile, people are also seeking comfort in riding, control precision of turning, and convenience in parking.

SUMMARY OF THE INVENTION

Thus, an objective of the present invention is to provide an electrical self-balancing scooter that is easy to assemble and disassemble.

The present invention provides a first kind of that comprises two wheels mounted on a wheel shaft, an accommodation body located between the two wheels, and a support frame mounted on the wheel shaft, wherein, the accommodation body comprises a first accommodation part and a second accommodation part on top of the first accommodation part, the first accommodation part comprises a side cover board, the second accommodation part comprises two partial cover boards, the two partial cover boards and the side cover board surround and form a cylindrical or partially cylindrical accommodation space having a cylinder axis passing through the wheel shaft, and an opening is formed at a joint of the two partial cover boards for the support frame to pass through.

The second accommodation part comprises a bottom plate and two semi-circle side plates located on both sides of the bottom plate, the bottom plate and the two side plates form a second accommodation space in a semi-cylindrical shape, the two partial cover boards are located to cover the second accommodation space.

The first accommodation part comprises two opposite lateral plates, a first accommodation space in a semi-cylindrical or partially semi-cylindrical shape is formed between the two lateral plates, the side cover board is located to cover the first accommodation space, the accommodation space consists of the first accommodation space and the second accommodation space.

The first accommodation part comprises an upper cover plate on top of the two lateral plates for covering the first accommodation space.

A power source is mounted within the first accommodation part, and a control system is mounted within the second accommodation part.

The second accommodation part is fixed on the wheel shaft, and the first accommodation part is fixed on the second accommodation part.

The support frame comprises a first bar connected to the wheel shaft, a second bar mounted on the first bar, and a handle part mounted on the second bar and rotatable relative to the second bar.

The support frame is provided with a fixed strut fixed on the first bar, a support member connected to the first bar in a rotatable manner, a bracket, and a seat mounted on the bracket, wherein, the bracket is connected to the fixed strut in a rotatable manner and also connected to the support member in a rotatable manner.

In another embodiment, the electrical self-balancing scooter comprises two wheels interconnected by one wheel shaft, and an accommodation body located between the two wheels, wherein, the accommodation body comprises a second accommodation part in a semi-cylindrical shape mounted on the wheel shaft and a first accommodation part mounted beneath the second accommodation part, the second accommodation part comprises two partial cover boards that surrounds a semi-cylindrical space The first accommodation part has a semi-cylindrical or partially semi-cylindrical shape, and comprises a side cover board that surrounds a semi-cylindrical or partially semi-cylindrical space.

In another embodiment, the electrical self-balancing scooter comprises two wheels mounted on a wheel shaft, and an accommodation body located between the two wheels, wherein, the accommodation body has an accommodation space in the circumferential direction of the wheels formed by two partial cover boards and one side cover board, the accommodation space comprises a first accommodation space covered by the side cover board and a second accommodation space covered by the two partial cover boards.

The accommodation space has a cylindrical or partially cylindrical shape.

Another objective of the present invention is to provide an electrical self-balancing scooter that improves turning control and makes the turning angle to be more precise.

The present invention discloses a second kind of electrical self-balancing scooter that comprises two wheels mounted on a wheel shaft, and a support frame located between the two wheels, wherein, the support frame comprises a bar mounted on the wheel shaft, with a handle part mounted on an upper end of the bar through a rotation mechanism, the rotation mechanism comprises a stator mounted on the bar and a rotor that is rotatable relative to the stator, the handle part is fixed on the rotor, the rotation mechanism is provided with an angle measurement device to measure a rotation angle of the rotor.

The rotation mechanism comprises a resilient torsion member having a plurality of locating holes on both upper and lower surfaces, the stator is provided with a chamber to receive the resilient torsion member as well as convex columns inside the chamber, the resilient torsion member is mounted to be received in the chamber with the convex columns of the stator inserted into the locating holes on the lower surface of the resilient torsion member, the rotor is provided with convex columns to be inserted into the locating holes on the upper surface of the resilient torsion member, so that a rotation of the rotor forces the resilient torsion member to deform elastically.

The rotor is mounted on the bar through a bearing.

The angle measurement device comprises a Hall sensor mounted on the rotor and a magnet mounted on the bar.

The bar comprises a first bar connected to the wheel shaft and a second bar mounted on the first bar, the handle part is mounted on an upper end of the second bar.

A housing rotatable along with the handle part is provided outside the rotation mechanism, a lower part of the housing is mounted on the second bar in a rotatable manner through a sleeve member; the sleeve member is provided with an upper flange at an upper end and a lower flange at a lower end; the lower part of the housing is provided with a clamping groove to clamp the upper flange of the sleeve member, and a lower end of the housing is arranged to abut the lower flange of the sleeve member.

The electrical self-balancing scooter comprises an accommodation part located between the two wheels, wherein, the accommodation body comprises a first accommodation part and a second accommodation part on top of the first accommodation part, the first accommodation part comprises a side cover board, the second accommodation part comprises two partial cover boards, the two partial cover boards and the side cover board form a cylindrical or partially cylindrical accommodation space having a cylinder axis passing through the wheel shaft, and an opening is formed at a joint of the two partial cover boards for the first bar to pass through.

The second accommodation part comprises a bottom plate and two semi-circle side plates located on both sides of the bottom plate, the bottom plate and the two side plates forms a second accommodation space in a semi-cylindrical shape, the two partial cover boards is located to cover the second accommodation space.

The first accommodation part comprises two opposite lateral plates, a first accommodation space in a semi-cylindrical or partially semi-cylindrical shape is formed between the two lateral plates, the side cover board is located to cover the first accommodation space, the accommodation space consists of the first accommodation space and the second accommodation space.

The first accommodation part comprises an upper cover plate on top of the two lateral plates for covering the first accommodation space.

Another objective of the present invention is to provide an electrical self-balancing scooter that has a seat for more comfortable riding.

The present invention discloses a third kind of electrical self-balancing scooter that comprises two wheels mounted on a wheel shaft, an accommodation body located between the two wheels, and a support frame fixedly connected on the wheel shaft, wherein, the support frame comprises a first bar connected to the wheel shaft, a fixed strut fixed on the first bar, a support member connected to the first bar in a rotatable manner, a bracket, and a seat mounted on the bracket; the bracket is connected to the fixed strut in a rotatable manner and also connected to the support member in a rotatable manner.

The bracket is provided with a first rotatable connection part and a second rotatable connection part, the first rotatable connection part is connected to the fixed strut in a rotatable manner through a shaft, the second rotatable connection part is connected to the support member in a rotatable manner through another shaft.

The first bar, the fixed strut and the support member are arranged to form a triangular shape.

The support member is a buffer damping bar.

The support frame comprises a support arm fixedly connected on the first bar, the support arm and the seat are located at opposite sides of the first bar, the support arm is provided with a pedal unit.

The support arm is provided with a plurality of pedal holes for placing the pedal unit.

The pedal unit is a straight rod.

The two wheels are mounted on one wheel shaft.

The support frame comprises a second bar mounted on the first bar, and a handle part is mounted on an upper end of the second bar, the handle part comprises a horizontal handle rod and upright handle rods mounted on both ends of the horizontal handle rod.

A horizontal bar is fixedly mounted on the first bar, with shield boards provided at both ends of the horizontal bar for roofing the two wheels.

Another objective of the present invention is to provide an electrical self-balancing scooter that is easy to assemble and disassemble.

The present invention discloses a fourth kind of electrical self-balancing scooter that comprises two wheels mounted on a wheel shaft, and a support frame mounted on the wheel shaft, wherein, the support frame comprises a first bar connected to the wheel shaft and a second bar mounted on the first bar through a connection assembly, the connection assembly comprises a first connection member fixed on the first bar, a second connection member fixed on the second bar, a first electrical connector mounted on the first connection member and a second electrical connector mounted on the second connection member, the first connection member and the second connection member are interconnected in a fixed manner, the first electrical connector and the second electrical connector are butt jointed for transmitting electrical signal.

The second connection member is provided with an insertion part through which the second connection member is fixedly connected to the second bar, the first connection member and the second connection member are both accommodated within the first bar.

A handle part is mounted on an upper end of the second bar through a rotation mechanism.

The support frame comprises a fixed strut fixed on the first bar, a support member connected to the first bar in a rotatable manner, a bracket, and a seat mounted on the bracket, wherein, the bracket is connected to the fixed strut in a rotatable manner and also connected to the support member in a rotatable manner.

An accommodation body is provided between the two wheels, wherein, the accommodation body comprises a first accommodation part and a second accommodation part on top of the first accommodation part, the first accommodation part comprises a side cover board, the second accommodation part comprises two partial cover boards, the two partial cover boards and the side cover board form a cylindrical or partially cylindrical accommodation space having a cylinder axis passing through the wheel shaft, and an opening is formed at a joint of the two partial cover boards for the first bar to pass through.

A shield board is provided over each of the wheels, and each of the shield boards is directly or indirectly fixed on the wheel shaft through an outside fixator and also fixed on the accommodation body through an inside fixator.

A pedal unit is provided on an outer side of each of the wheels, the pedal unit comprises a pole mounted on the wheel shaft and a pedal mounted on the pole in a rotatable manner, the outside fixator is connected to the wheel shaft by being fixed on the pole.

The second accommodation part comprises a bottom plate and two semi-circle side plates located on both sides of the bottom plate, the bottom plate and the two side plates forms a second accommodation space in a semi-cylindrical shape, the two partial cover boards is located to cover the second accommodation space.

The first accommodation part comprises two opposite lateral plates, a first accommodation space in a semi-cylindrical or partially semi-cylindrical shape is formed between the two lateral plates, the side cover board is located to cover the first accommodation space, the accommodation space consists of the first accommodation space and the second accommodation space.

The first accommodation part comprises an upper cover plate on top of the two lateral plates for covering the first accommodation space.

Another objective of the present invention is to provide an electrical self-balancing scooter that is convenient to park.

The present invention discloses a fifth kind of electrical self-balancing scooter that comprises two wheels mounted on a wheel shaft, and a support frame mounted on the wheel shaft, wherein, a stay bar is provided on one side of the support frame for bracing against the ground, a seat is provided on the other side of the support frame, pedal units are provided on both lateral sides of the wheels, the stay bar is able to be rotated between a bracing position and a folded position.

The stay bar is mounted on the support frame through a holder which comprises a bottom portion fixedly connected to the support frame as well as a first lug and a second lug extending from the bottom portion and arranged opposite each other, the stay bar is mounted between the first lug and the second lug in a rotatable manner by means of a rotation shaft.

The first lug is provided with an arc-shaped slot, the stay bar is provided with a first screw hole which is farther away from the bottom portion of the holder than the rotation shaft; a resilient locating pin is mounted in the first screw hole by passing through the arc-shaped slot, the resilient locating pin is able to move within the arc-shaped slot along with rotation of the stay bar; the resilient locating pin comprises a screw cylinder with an outer screw, a core adapted to slide inside the screw cylinder, a core cap connected on the core, and a resilient member mounted inside the screw cylinder in connection with the core and always in a stretched state; the screw cylinder is mounted in the first screw hole by means of its outer screw; the second lug is provided with a first locating bore and a second locating bore, when the stay bar is in the bracing position, the core is inserted into the first locating bore, and when the stay bar is in the folded position, the core is inserted into the second locating bore.

The stay bar is provided with a second screw hole, a second resilient pin is mounted in the second screw hole, the second resilient pin comprises a connection cylinder connected with the second screw hole, a sliding ball part with a spherical surface provided on the connection cylinder, and a resilient part provided between the sliding ball part and the connection cylinder; the spherical surface of the sliding ball part is arranged to protrude from the connection cylinder for abutting the first lug or the second lug.

The support frame comprises a first bar connected to the wheel shaft, a fixed strut fixed on the first bar, a support member connected to the first bar in a rotatable manner, a bracket, and a seat mounted on the bracket, wherein, the bracket is connected to the fixed strut in a rotatable manner and also connected to the support member in a rotatable manner.

The support frame comprises a second bar mounted on the first bar, and a handle part mounted on an upper end of the second bar through a rotation mechanism.

An accommodation body is provided between the two wheels, wherein, the accommodation body comprises a first accommodation part and a second accommodation part on top of the first accommodation part, the first accommodation part comprises a side cover board, the second accommodation part comprises two partial cover boards, the two partial cover boards and the side cover board form a cylindrical or partially cylindrical accommodation space having a cylinder axis passing through the wheel shaft, and an opening is formed at a joint of the two partial cover boards for the first bar to pass through.

A shield board is provided over each of the wheels, and each of the shield boards is directly or indirectly fixed on the wheel shaft through an outside fixator and also fixed on the accommodation body through an inside fixator.

A pedal unit is provided on an outer side of each of the wheels, the pedal unit comprises a pole mounted on the wheel shaft and a pedal mounted on the pole in a rotatable manner, the outside fixator is connected to the wheel shaft by being fixed on the pole.

The stay bar comprises a connection segment connected to the holder and a brace segment mounted on the connection segment, the brace segment has a hollow structure.

The support frame is provided with a catch unit for catching the stay bar.

The electrical self-balancing scooter disclosed by the present invention has the following beneficial effects:

1) In the electrical self-balancing scooter disclosed by the present invention, the accommodation body comprises a first accommodation part and a second accommodation part, so that the accommodation body is easy to assemble and disassemble; the two partial cover boards and the side cover board surround and form a cylindrical or partially cylindrical accommodation space having a cylinder axis passing through the wheel shaft, so that the accommodation body has a rounded shape between the two wheels, which makes the appearance of the entire vehicle have harmonious beauty.

2) In the electrical self-balancing scooter disclosed by the present invention, the rotation mechanism and its angle measurement device are located between the bar and the handle part, so that the precision of turning control is increased, as compared to the arrangement of mounting the rotation mechanism on a lower end of the bar.

3) In the electrical self-balancing scooter disclosed by the present invention, the seat is mounted on the bracket, the bracket is connected to the fixed strut in a rotatable manner and also connected to the support member in a rotatable manner, so that the body posture adjustment of the rider is achieved by relative rotation of the bracket in cooperation with the support member, which makes the adjustment motion smoother and provides a comfortable riding experience.

4) In the electrical self-balancing scooter disclosed by the present invention, the first bar is connected to the second bar through a connection assembly, when disassembling the scooter, it only requires to take apart the connection assembly so that the first connection member and the second connection member are taken apart and the first electrical connection member and the second electrical connector are taken apart; when assembling the scooter, it only requires to interconnect the first connection member and the second connection member and butt-join the first electrical connector and the second electrical connector, therefore, it is convenient to assemble and disassemble the scooter at will.

5) In the electrical self-balancing scooter disclosed by the present invention, the stay bar for bracing against the ground is provided on one side of the support frame of the electrical self-balancing scooter, the stay bar is able to be rotated between a bracing position and a folded position. When the scooter needs to be parked, it only requires to unfold the stay bar into the bracing position so that the scooter can be parked. When the scooter is running, the stay bar can be folded into the folded position so as to reduce the space occupied by the stay bar. The electrical self-balancing scooter of the present invention also has a seat and pedal units, the pedal units are arranged on the outer sides of the wheels, so that a rider can tread on the pedal units and sit on the seat when riding the scooter, which increases the comfort of riding.

DETAILED DESCRIPTION OF EMBODIMENTS

Hereinafter, the embodiments of the present invention are described in detail with reference to the accompanying drawings. The embodiments of the present invention are intended for further explaining and illustrating the present invention, not limiting the protection scope of the present invention.

Embodiment 1

Figure 1:
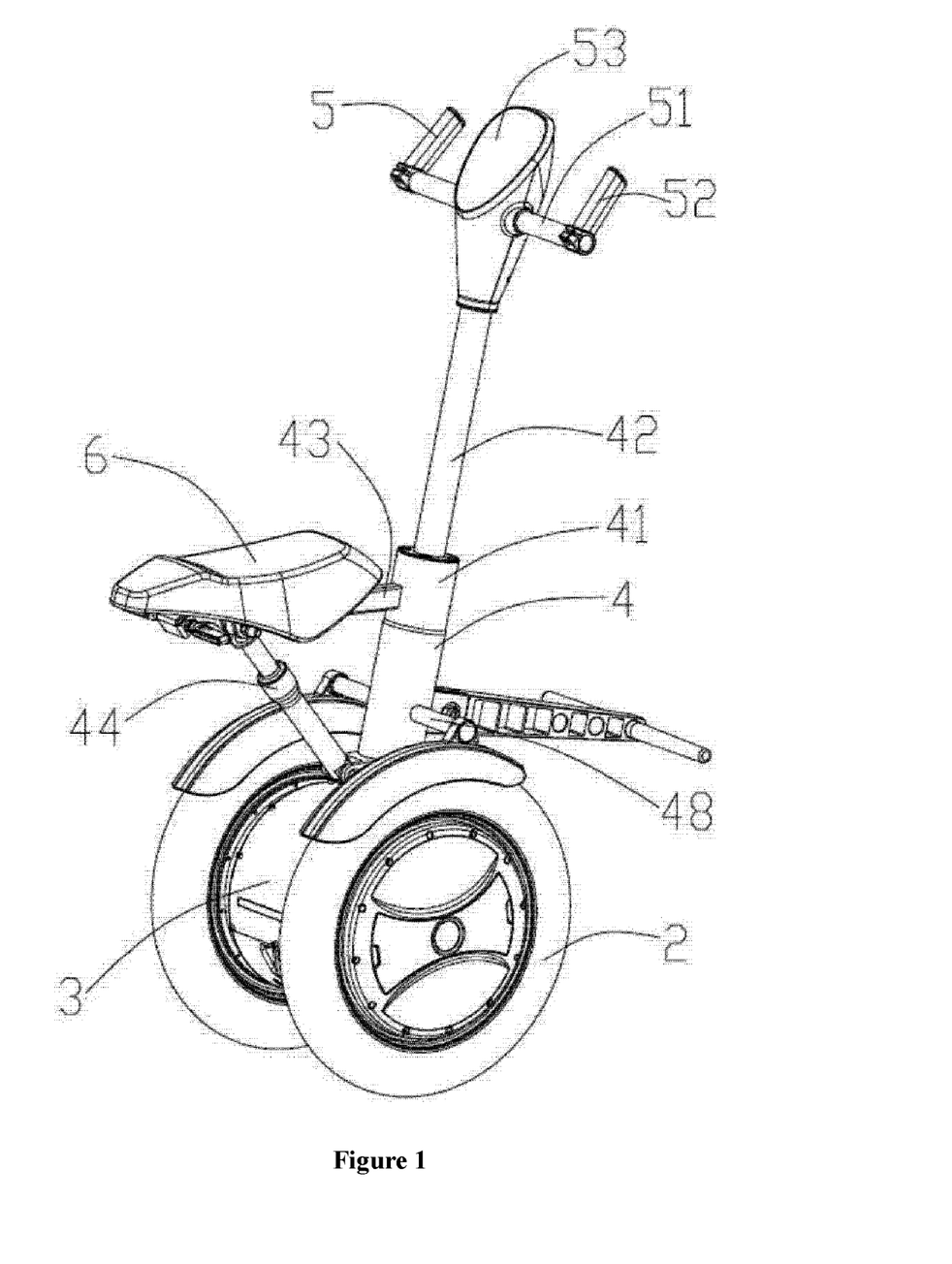
FIG. 1 is a stereogram of a first embodiment of the electrical self-balancing scooter disclosed by the present invention.
Figure 2:
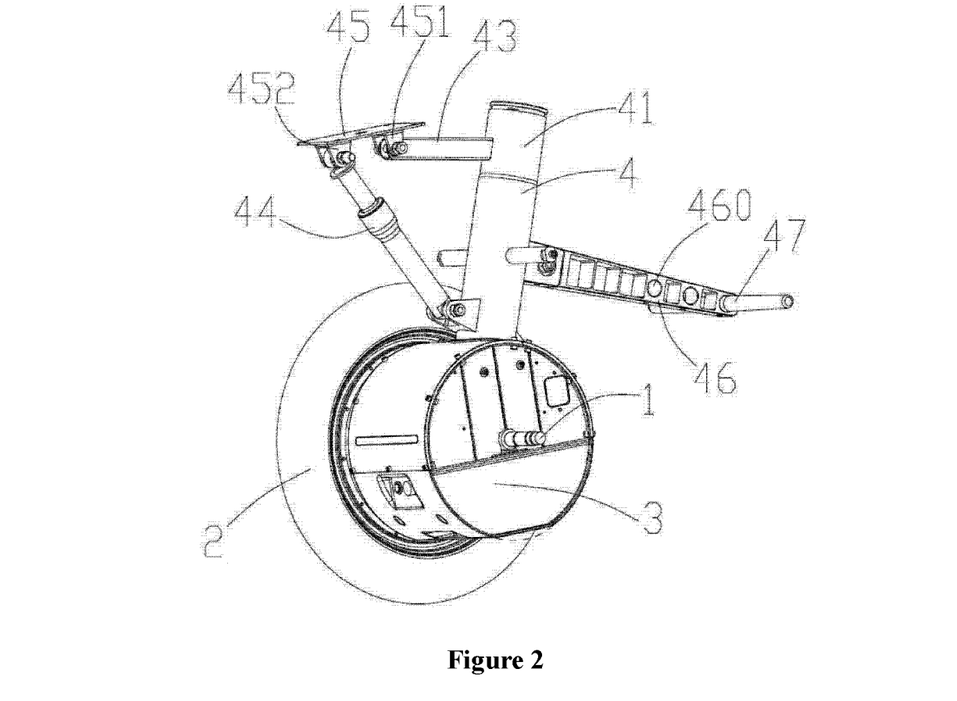
FIG. 2 is a stereogram of a support frame, an accommodation body and one wheel of the electrical self-balancing scooter shown in FIG. 1.

Referring to FIG. 1 and FIG. 2, the electrical self-balancing scooter of the present invention comprises two wheels 2 mounted on a wheel shaft 1, an accommodation body 3 located between the two wheels 2, a support frame 4 fixedly connected on the wheel shaft 1, a handle part 5 and a seat 6 mounted on the support frame 4.

The support frame 4 comprises a first bar 41 connected to the wheel shaft 1, a second bar 42 mounted on the first bar 41 and along the extending direction of the first bar 41, a fixed strut 43 fixed on the first bar 41, a support member 44 connected to the first bar 41 in a rotatable manner, and a bracket 45. The seat 6 is mounted on the bracket 45. The fixed strut 43, the support member 44 and the first bar 41 are arranged to form a triangular shape, so that good stability is provided when these three components are stationary relative to one another.

The bracket 45 is provided with a first rotatable connection part 451 and a second rotatable connection part 452, the first rotatable connection part 451 is connected to the fixed strut 43 in a rotatable manner through a shaft, and the second rotatable connection part 452 is connected to the support member 44 in a rotatable manner through another shaft. In addition, the support member 44 is also connected to the first bar 41 in a rotatable manner through yet another shaft. The electrical self-balancing scooter of the present invention can control the running of the vehicle body by the gravity center of a rider. When the vehicle body is in a stationary state, forward movement of the gravity center of the rider makes the vehicle body to run forward, and backward movement of the gravity center of the rider makes the vehicle body to run backward. When the vehicle body is running forward, backward movement of the gravity center of the rider slows down the forward moving vehicle body. When the vehicle body is running backward, forward movement of the gravity center of the rider slows down the backward moving vehicle body. Therefore, when the rider sitting on the seat 6 controls the vehicle body, he/she needs to continuously move his/her body to adjust the gravity center. The body posture adjustment of the rider is achieved by relative rotation of the bracket 45 in cooperation with the support member 44, which makes the adjustment motion smoother and provides a comfortable riding experience. The support member 44 is provided as a buffer damping bar, which reduces bumping and further improves riding comfort. The buffer damping bar may be a bar having a damping effect such as a hydraulic damping bar or a spring damping bar.

Figure 4:
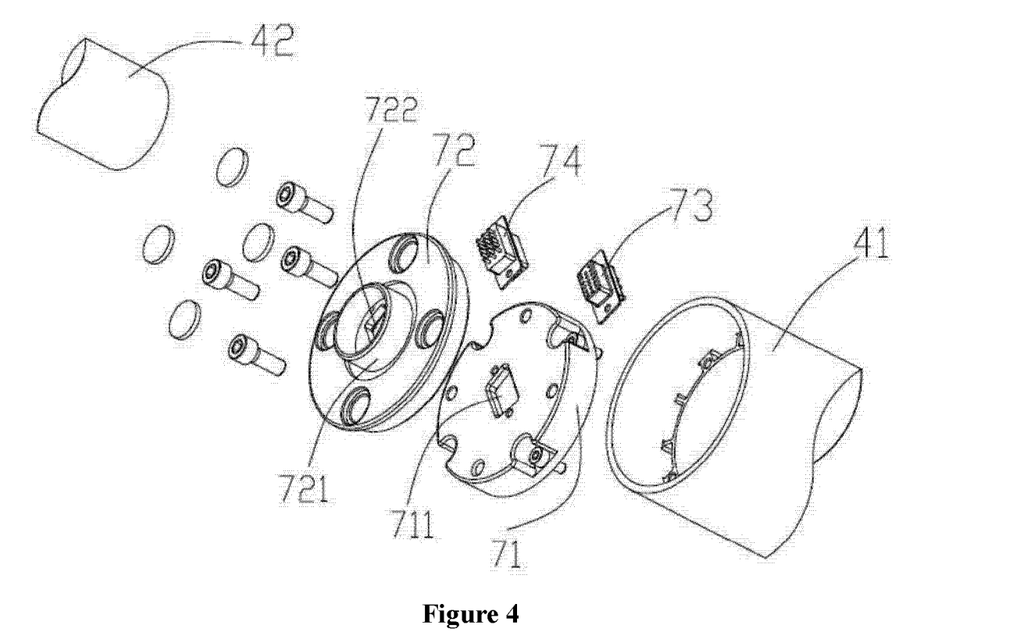
FIG. 4 is an exploded view of the connection part between a first bar and a second bar of the first embodiment of the electrical self-balancing scooter disclosed by the present invention.

Referring to FIG. 4, the second bar 42 is mounted on the first bar 41 through a connection assembly. The connection assembly comprises a first connection member 71, a second connection member 72, a first electrical connector 73 mounted on the first connection member 71 and a second electrical connector 74 mounted on the second connection member 72 for butt-joining with the first electrical connector 73. The first connection member 71 is mounted inside an upper end portion of the first bar 41 through fastening means such as screws, bolts and studs. A cylindrical insertion part 721, with a slot 722 in the insertion part 721, is provided at the center portion of the second connection member 72 for being inserted into a lower end portion of the second bar 42. The second electrical connector 74 is mounted inside the slot 722, one end of the second electrical connector 74 is for connecting to electrical wires inside the second bar 42, and the other end thereof is for butt-joining with the first electrical connector 73. Another slot 711 is provided at the center portion of the first connection member 71, the first electrical connector 73 is mounted inside this slot 711, one end of the first electrical connector 73 is for butt joining with the second electrical connector 74, and the other end thereof is for connecting to electrical wires inside the first bar 41. The insertion of the insertion part 721 of the second connection member 72 into the second bar 42 can be fastened by welding or by a connected fastener. The second connection member 72 and the first connection member 71 are fixed together through a fastener, and then both received inside the first bar.

In this embodiment, the first bar 41 and the second bar 42 are provided as two sections mounted together, in order to reduce the volume of the package for sale and facilitate transporting. After a consumer buys it, he/she can assemble it by himself/herself. Of course, in other embodiments, the first bar 41 and the second bar 42 can be provided as one integral bar.

Referring to FIG. 1, the handle part 5 is mounted on an upper end of the second bar 42. The handle part 5 comprises a horizontal handle rod 51, upright handle rods 52 mounted on both ends of the horizontal handle rod 51, and a display device 53 located on the middle portion of the horizontal handle rod. The display device 53 can be used to display the vehicle condition of the electrical self-balancing scooter, such as a running speed and remaining electric power. The horizontal handle rod 51 and the upright handle rods 52 can meet various holding postures of the rider.

Figure 5:
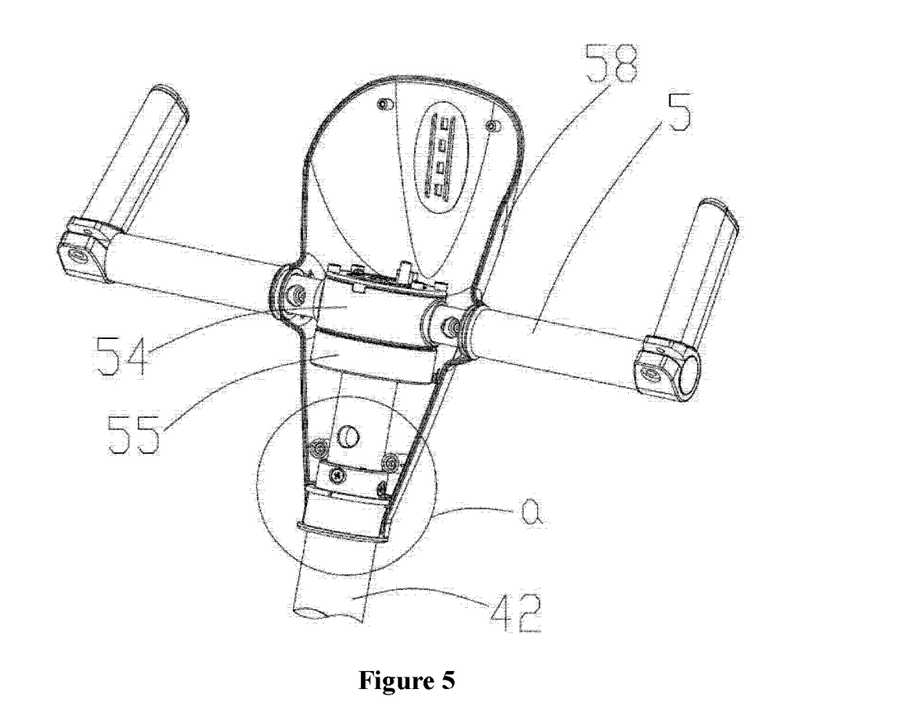
FIG. 5 is a view of the connection between a handle part and the second bar of the first embodiment of the electrical self-balancing scooter disclosed by the present invention.
Figure 6:
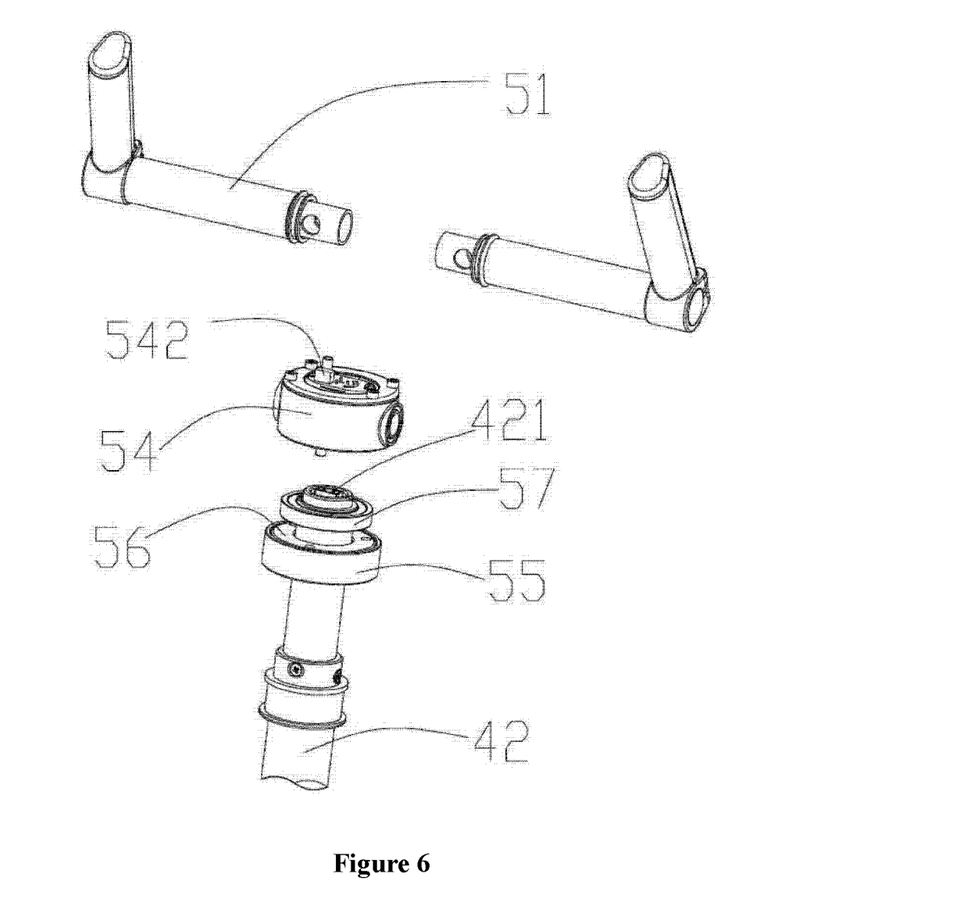
FIG. 6 is an exploded view of a part of the structure shown in FIG. 5.
Figure 7:
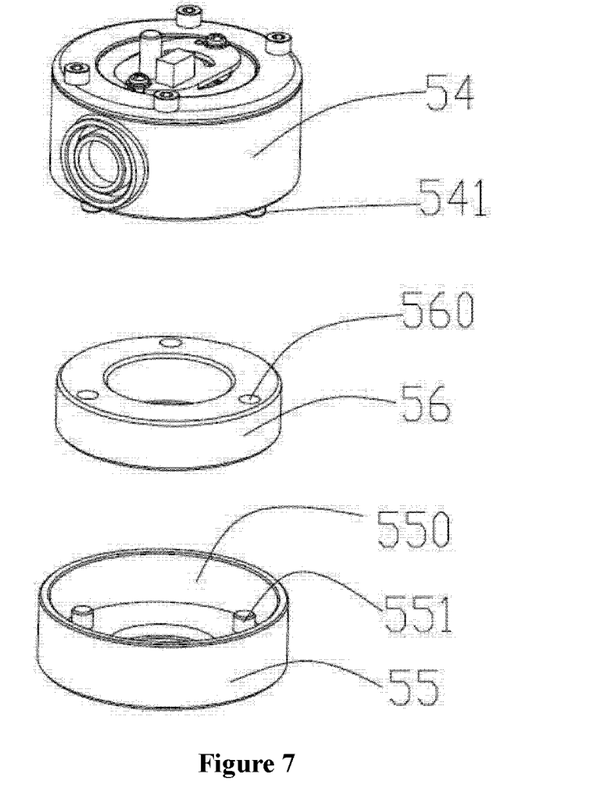
FIG. 7 is an exploded view of the rotation mechanism of the structure shown in FIG. 5.

Referring to FIGS. 5-7, the handle part 5 is mounted on the second bar 42 through a rotation mechanism, the rotation mechanism comprises a rotor 54, a stator 55 and a resilient torsion member 56. The horizontal handle rod 51 is fixedly mounted on the rotor 54. The stator 55 is fixedly mounted on the second bar 42. A Hall sensor 542 is provided on the rotor 54, and a magnet 421 is provided on the head portion of the second bar 42. The Hall sensor 542 and the magnet 421 cooperate to form an angle measurement device for measuring a rotation angle of the handle part.

The rotor 54 is rotatably mounted upon the stator 55 through a bearing 57. The stator 55 is provided with a chamber 550 to receive the resilient torsion member 56, a plurality of convex columns 551 is provided inside the chamber 550 for locating the resilient torsion member 56. A lower end of the rotor 54 is also provided with a plurality of convex columns 541 for locating the resilient torsion member 56. The upper surface of the resilient torsion member 56 is provided with concave locating holes 560 having a number that corresponds to the number of convex columns 541 of the rotor 54, and the lower surface of the resilient torsion member 56 is also provided with concave locating holes 560 having a number that corresponds to the number of the convex columns 551 of the stator 55. A head portion of the resilient torsion member 56 passing through the second bar 42 is placed in the chamber 550 of the stator 55, and the convex columns 551 are individually inserted into the locating holes 560 on the lower surface of the resilient torsion member 56; a head portion of the rotor 54 passing through the second bar 42 is sleeved on the bearing 57, and the convex columns 541 are individually inserted into the locating holes 560 on the upper surface of the resilient torsion member 56. Rotation of the handle part 5 will cause the rotation of the rotor 54, and in turn the rotor 54 will cause torsion of the upper part of the resilient torsion member 56 by means of the convex columns 541, at this time, the Hall sensor 542 detects a rotation angle and transmits the detected rotation angle to a control system, the control system controls the vehicle body to turn. In the meantime, the lower part of the resilient torsion member 56 is kept stationary relative to the stator 55 because of being held by the convex columns 551, so that the resilient torsion member 56 is twisted to deform resiliently. When the turning is finished, the rotation force of the handle part 5 disappears, and the resilient torsion member 56 returns to its initial status, so as to cause the rotor 54 to return to its initial unturned position. Therefore, the electrical self-balancing scooter of the present invention has an automatic restoration capability when making turns.

The rotation mechanism of the present invention is mounted on an upper end of the second bar 42, together with the handle part 5, so that the precision of turning control is increased, as compared to the arrangement of mounting the rotation mechanism on a lower end of the support frame 4. In this embodiment, the angle measurement device adopts a combination of a Hall sensor and a magnet. In other embodiments, different forms of angle sensors can also be used.

Figure 8:
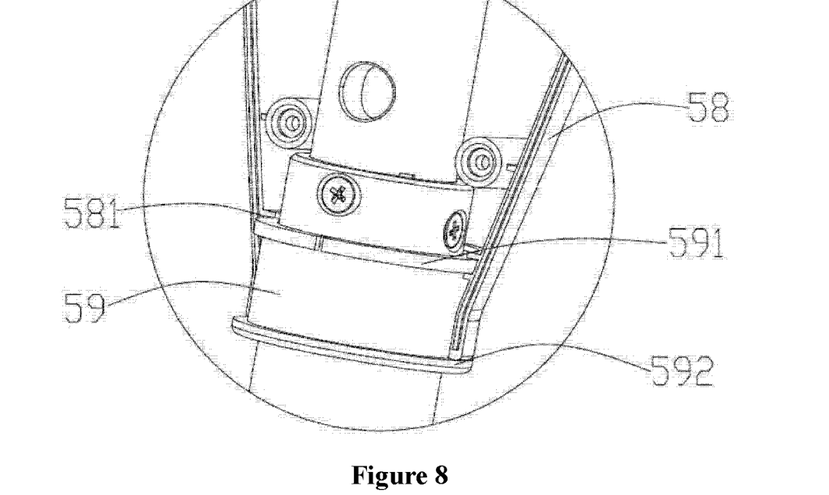
FIG. 8 is an enlarged view of the structure in the circle denoted "a" in FIG. 5.

Referring to FIGS. 1, 5 and 8, a housing 58 is provided outside the rotation mechanism of the electrical self-balancing scooter of the present invention, and the display device 53 is fixedly mounted on the housing 58. The housing 58 is rotatable along with the handle part. A lower part of the housing 58 is mounted on the upper end of the second bar 42 in a rotatable manner through a sleeve member 59. The sleeve member 59 is provided with an upper flange 591 at an upper end and a lower flange 593 at a lower end. The lower part of the housing 58 is provided with a clamping groove 581 to clamp the upper flange 591 of the sleeve member 59, and a lower end of the housing 58 is arranged to abut the lower flange 592 of the sleeve member 59, so that the sleeve member 59 is able to rotate along with the housing 58. The sleeve member 59 is made of a material having good lubricating property, such as polyformaldehyde, so that the housing is able to rotate relative to the second bar 42 in a smooth manner.

Referring to FIG. 1 and FIG. 2, the support frame 4 comprises a support arm 46 fixedly connected on the first bar 41, the support arm 46 is provided with a plurality of pedal holes 460 for placing a pedal unit 47. According to requirements of different riders, the pedal unit 47 can be selectively inserted into different pedal holes 460 so as to adjust the distance between the pedal unit 47 and the first bar 41 to fit riders with different body shapes. In this embodiment, the pedal unit 47 is a straight rod, which has a simple structure and is easy to mount. The support arm 46 and the seat 6 are located at opposite sides of the first bar 41, so as to allow the rider to sit on the seat and at the same time put his/her feet on the pedal unit 47. In addition, the support arm 46 can also be used to support the vehicle body when parking the scooter.

Figure 3:
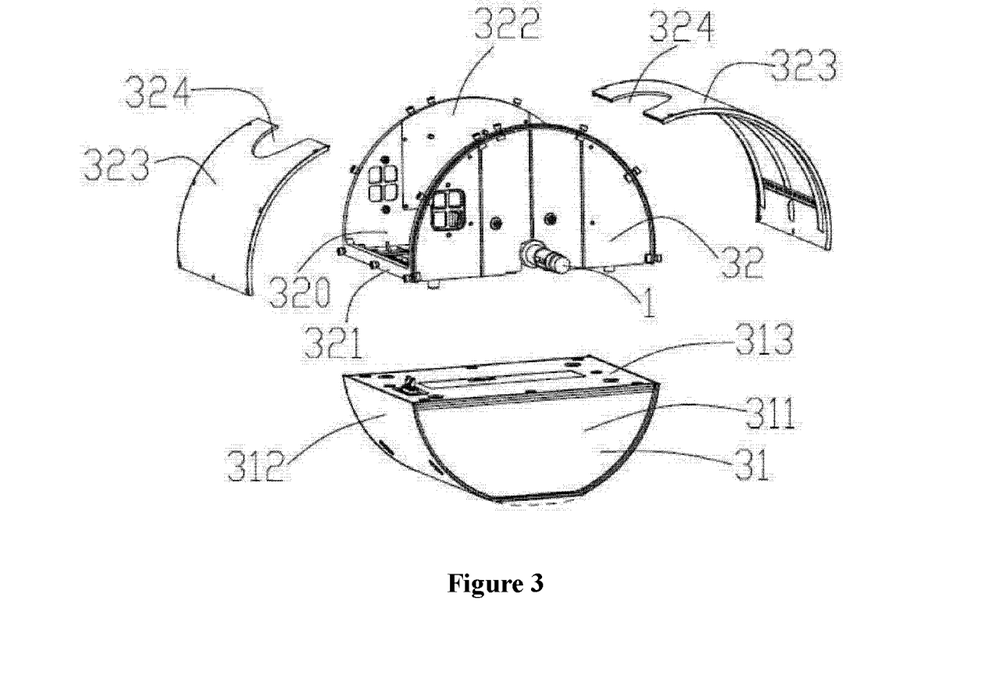
FIG. 3 is an exploded view of the accommodation body of the first embodiment of the electrical self-balancing scooter disclosed by the present invention.

Referring to FIG. 2 and FIG. 3, the accommodation body 3 comprises a first accommodation part 31 at a lower position and a second accommodation part 32 at an upper position. The second accommodation part 32 comprises a bottom plate 321, two semi-circle side plates 322 located on both sides of the bottom plate 321, and two partial cover boards 323. A second accommodation space 320 in a semi-cylindrical shape is formed by the two side plates 322 and the bottom plate 321. This second accommodation space 320 is for accommodating and fixing various circuits and associated electronic elements of the control system. The two partial cover boards 323 are placed upon the two side plates 322 so as to cover the second accommodation space 320. The joining edges of the two side plates 322 are respectively provided with a semi-circle opening 324, and the two semi-circle openings 324 are joined together for the first bar 41 to pass through. The second accommodation part 32 is provided with a clamping groove for fitting onto the wheel shaft 1. In one embodiment, the first accommodation part 31 comprises two semi-circle lateral plates 311, a side cover board 312 and an upper plate 313. A first accommodation space in a semi-cylindrical shape is formed by the two lateral plates 311 and the side cover board 312. This first accommodation space is mainly for accommodating the power source. The upper plate 313 covers the first accommodation space on the top. The first accommodation part 31 is mounted beneath the second accommodation part 32 through fasteners. The entire accommodation body 3 forms a cylindrical shape between the two wheels 2, with the first accommodation space and the second accommodation space forming the accommodation space of the accommodation body. As known, miniaturization and portability are development trends for electrical self-balancing scooters. Mounting both wheels 2 on one same wheel shaft 1 can simplify the connection mechanism of the two wheels 2, and at the same time is beneficial for reducing the outline dimensions of the vehicle body. The present invention uses a cylindrical accommodation body 3 to accommodate the power source and the control system, and this accommodation body 3 is mounted on the wheel shaft 1 and between the two wheels, with the wheel shaft 1 passing through the cylinder center of the accommodation body 3, so that the space between the two wheels 2 is sufficiently utilized. The wheels and the accommodation body are all circular, both centrally symmetric and axially symmetric, so that the harmonious and aesthetic appearance of the entire vehicle body is elevated.

In a further preferred embodiment, a bottommost portion of the accommodation body 3 can be cut off, that is to say, the first accommodation part 31 is not a whole semi-cylindrical shape. The bottom of the first accommodation part 31 is set as a flat plane, so as to improve the travel ability of the vehicle body, in particular, a relatively large barrier object can pass through below the vehicle body. Namely, the first accommodation part 31 has a partially semi-cylindrical shape, and the accommodation body 3 has a partially cylindrical shape.

The accommodation body 3 has an accommodation space along the circumferential direction of the wheels, formed by the two partial cover boards 323 and the side cover board 312. Such arrangement facilitates the mounting and disassembling of the accommodation body.

In this embodiment, the lower first accommodation part 31 is used for mounting the power source, and the upper second accommodation part 32 is used for mounting the control system. Because the power source usually has a heavier weight than the control system, mounting the power source at the lower part is beneficial for lowering the gravity center of the vehicle body and increasing the stability thereof. Of course, in other embodiments, the power source can also be mounted inside the upper second accommodation part, while the control system is mounted inside the lower first accommodation part.

Referring to FIG. 1, a horizontal bar 48 is fixedly mounted on the first bar 41, with shield boards 49 provided at both ends of the horizontal bar 48 for roofing the two wheels.

Embodiment 2

Figure 9:
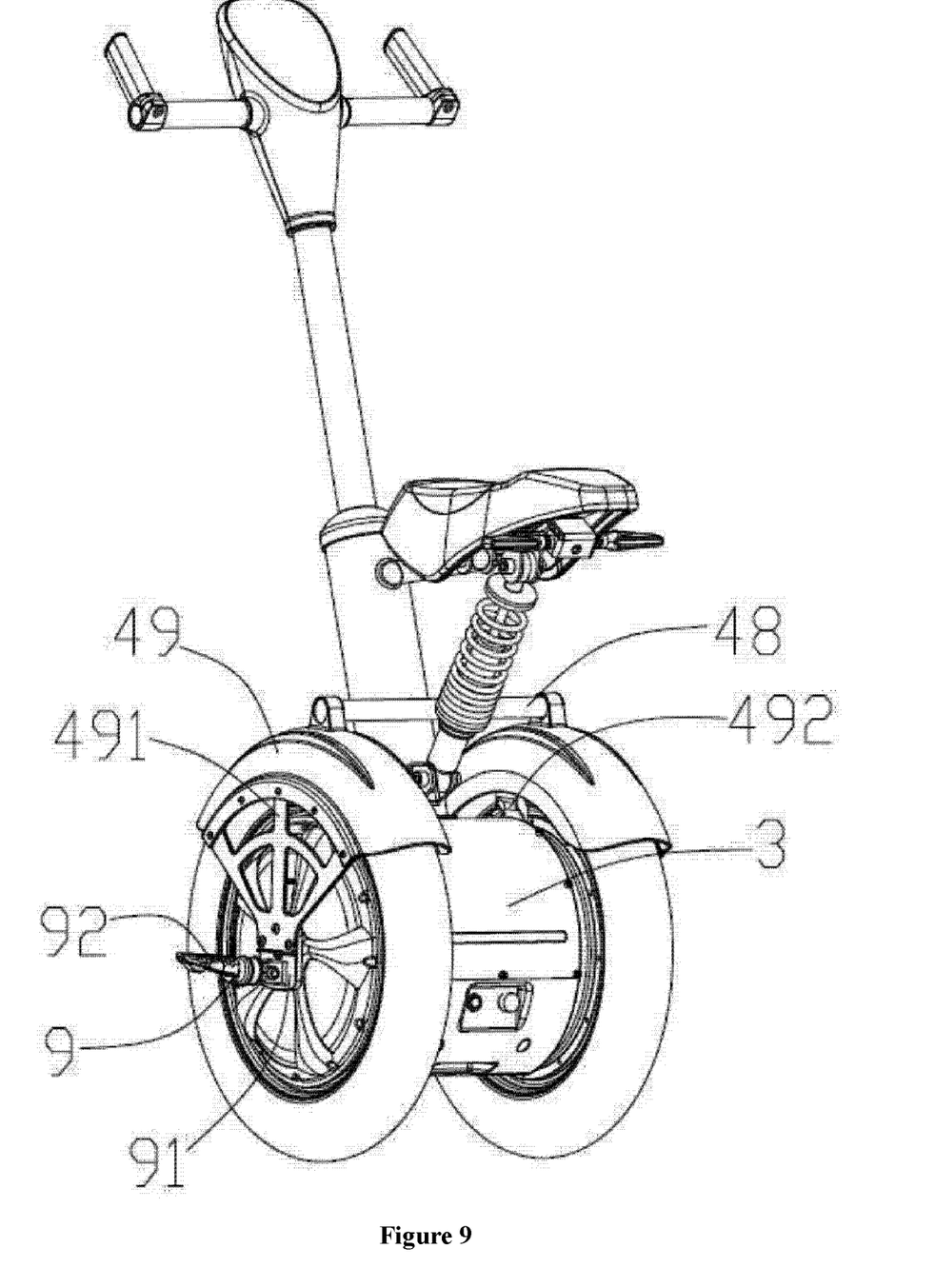
FIG. 9 is a stereogram of a second embodiment of the electrical self-balancing scooter disclosed by the present invention.

FIG. 9 shows a second embodiment of the electrical self-balancing scooter of the present invention. This second embodiment differs from the first embodiment mainly in the fixing structure of the shield boards 49 as well as second pedal units 9 on two outer sides of the two wheels.

Each of the second pedal units 9 comprises a pole 91 mounted on the wheel shaft and a pedal 92 mounted on the pole 91 in a rotatable manner In this embodiment, aside from being fixed through the horizontal bar 48, each of the shield boards 49 is further provided with an outside fixator 491, wherein, one end of the outside fixator 491 is fixedly connected to the pole 91, and the other end thereof is fixedly connected to a lower edge of the shield board 49 on the outer side of the wheel. Furthermore, it may also be provided with an inside fixator 492, wherein, one end of the inside fixator 492 is fixedly connected to the accommodation body 3, and the other end thereof is fixedly connected to another lower edge of the shield board 49 on the inner side of the wheel.

In consideration that a rider often collides with the shield boards 49 during riding, the stability of the shield boards can be improved by the above-mentioned fixed connection.

Embodiment 3

Figure 10:
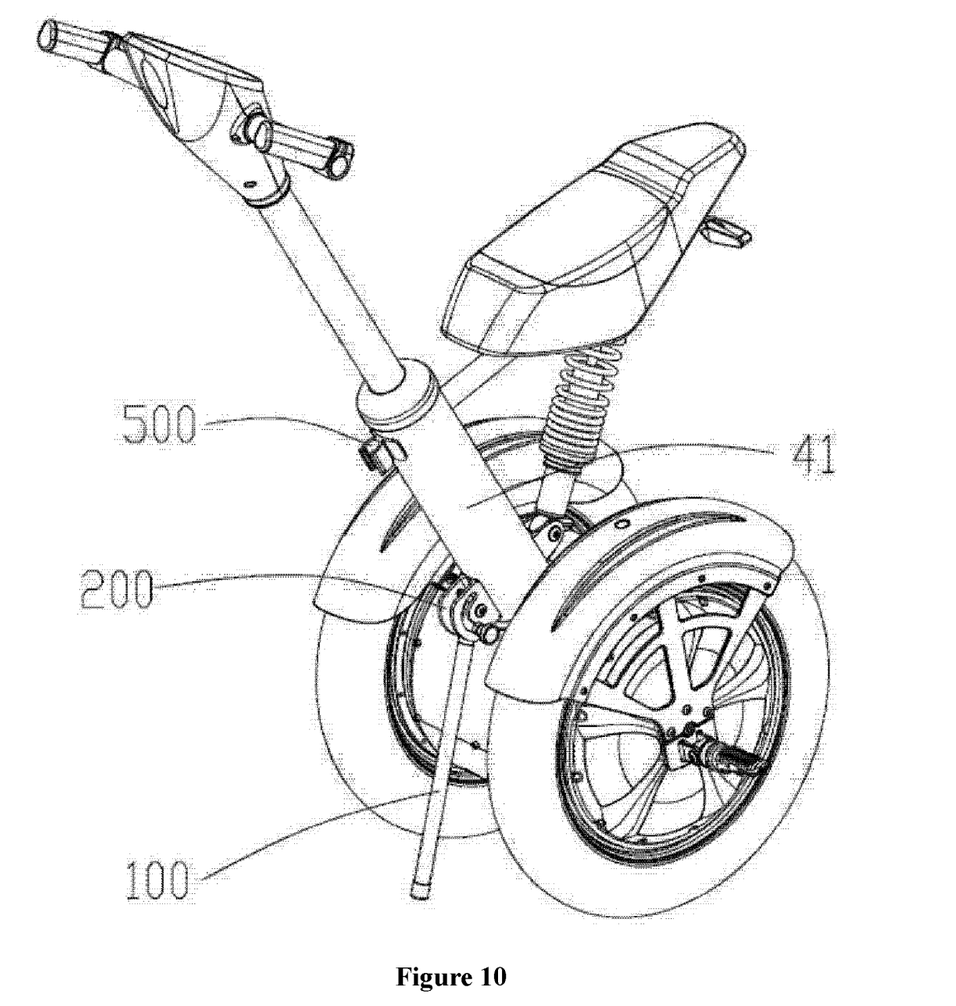
FIG. 10 is a stereogram of a third embodiment of the electrical self-balancing scooter disclosed by the present invention, wherein the stay bar is in a bracing position.
Figure 11:
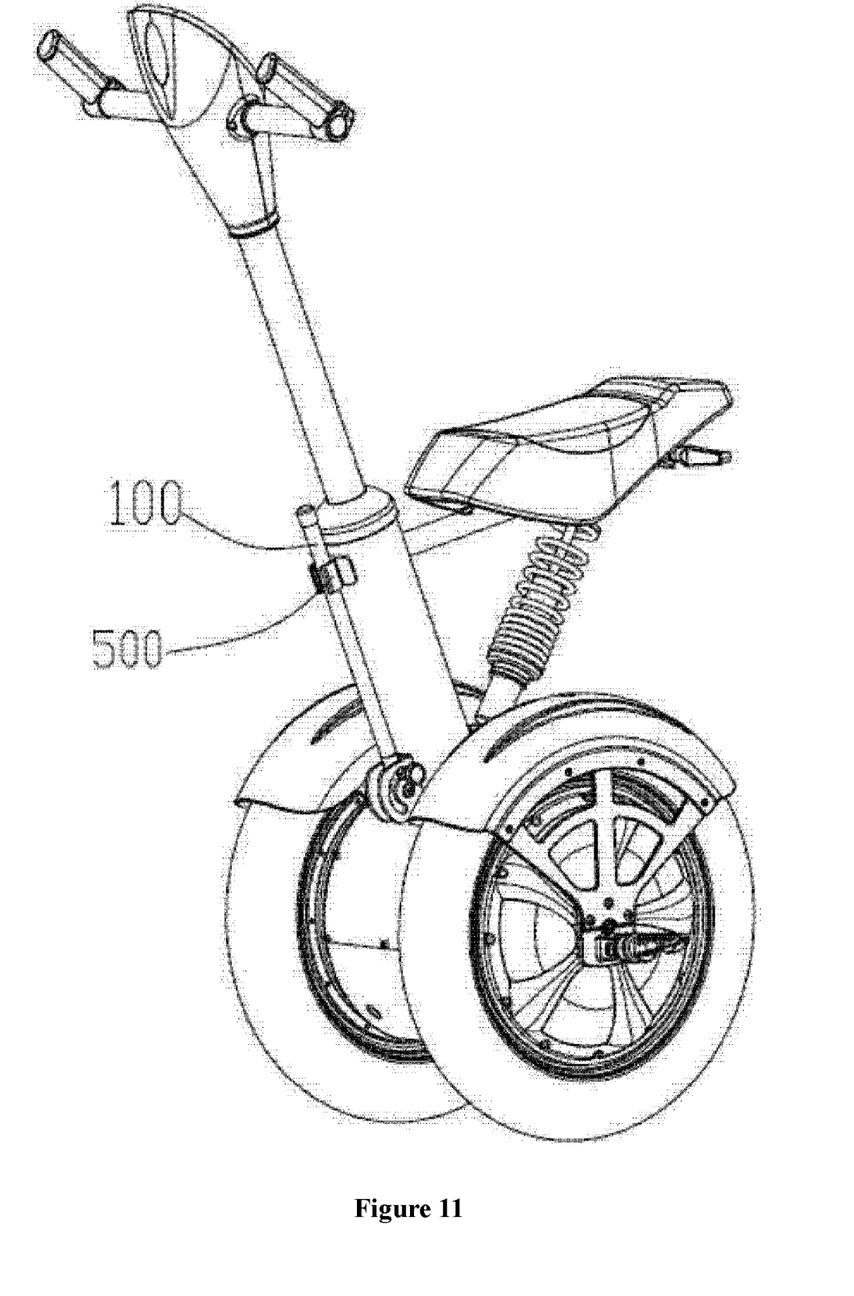
FIG. 11 is a stereogram of the electrical self-balancing scooter shown in FIG. 10, wherein the stay bar is in a folded position.
Figure 12:
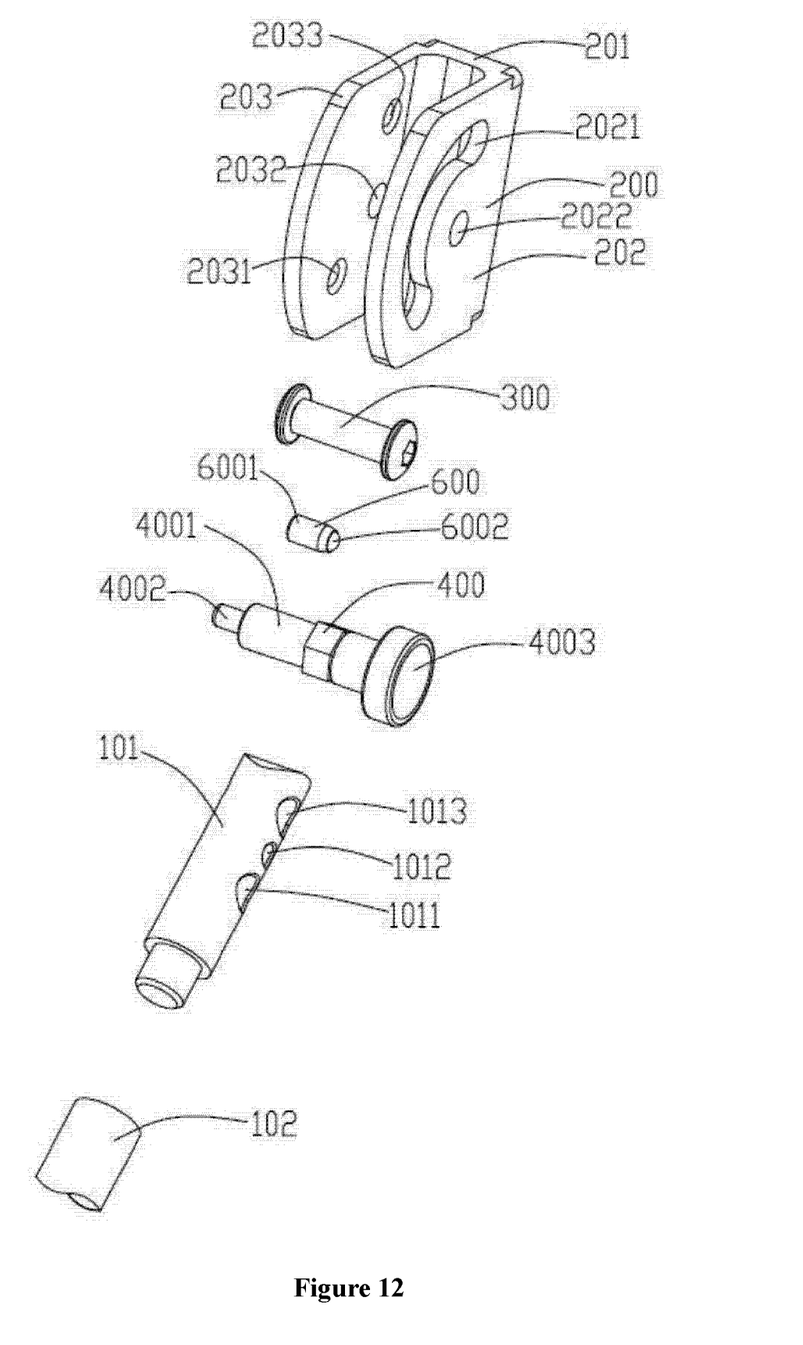
FIG. 12 is an exploded view of the stay bar and a holder of the electrical self-balancing scooter shown in FIG. 10.

FIGS. 10-12 show a third embodiment of the electrical self-balancing scooter of the present invention. This third embodiment differs from the second embodiment mainly in a stay bar 100 mounted on a front side of the first bar 41.

The stay bar 100 is mounted on the first bar 41 through a holder 200. The holder 200 comprises a bottom portion 201 fixedly connected to the first bar 41, and a first lug 202 and a second lug 203 extending from the bottom portion 201 and arranged opposite each other. The first lug 202 is provided with an arc-shaped slot 2021 and a first shaft hole 2022. The second lug 203 is provided with a second shaft hole 2032, a first locating bore 2031 and a second locating bore 2033. The first shaft hole 2022 is positioned opposite the second shaft hole 2032, for mounting a rotation shaft 300. The first locating bore 2031 and the second locating bore 2033 respectively correspond to the two ends of the arc-shaped slot 2021.

The stay bar 100 may be provided in an integral part, or may be provided in two segments. Hereinafter, it is described as a two-segment bar. The two-segment stay bar 100 comprises a connection segment 101 connected to the holder 200 and a brace segment 102 mounted on the connection segment 101. The connection segment 101 is sequentially provided with a first screw hole 1011, a second screw hole 1012 and a third shaft hole 1013. The third shaft hole 1013 is positioned across from the first shaft hole 2022 and across from the second shaft hole 2032. The first screw hole 1011 is for fixedly mounting a resilient locating pin 400. The resilient locating pin 400 comprises a screw cylinder 4001 with an outer screw, a core 4002 adapted to slide inside the screw cylinder 4001, a core cap 4003 connected on the core 4002, and a resilient member mounted inside the screw cylinder 4001 in connection with the core 4002 and always in a stretched state. Because the resilient member is always kept in a stretched state, the resilient member always exerts a force between the core 4002 and the screw cylinder 4001, and this force keeps the core cap 4003 abutting on the screw cylinder 4001. In other words, an external force would be required to pull the core cap 4003 to make the core 4002 slide inside the screw cylinder 4001; when the external force disappears, the core 4002 and the core cap 4003 will automatically return to their initial positon. The resilient locating pin 400 is mounted in the first screw hole 1011 by passing through the arc-shaped slot 2021, and the fixing is achieved by cooperation of the outer screw of the screw cylinder 4001 and an inner screw of the first screw hole 1011. The mounted screw cylinder 4001 is on an outer side of the rotation shaft 300, that is to say, the mounted screw cylinder 4001 is farther away from the bottom portion 201 of the holder than the rotation shaft 300.

When the stay bar 100 rotates around the rotation shaft 300 between the two lugs, the resilient locating pin 400 rotates along with the stay bar 100 and within the arc-shaped slot 2021, and at the same time the core 4002 abuts against the second lug 203. When the resilient locating pin 400 rotates to a lower end of the arc-shaped slot 2021, the stay bar 100 rotates to a bracing position, the core 4002 protrudes into the first locating bore 2031, so that the stay bar 100 is locked in the bracing position and thus braces the vehicle body, and the vehicle body can then be parked. By pulling the core cap 4003 to pull the core 4002 out of the first locating bore 2031, the resilient locating pin 400 and the stay bar 100 can return to a rotatable status. When the resilient locating pin 400 rotates to an upper end of the arc-shaped slot 2021, the stay bar 100 rotates to a folded position, the core 4002 protrudes into the second locating bore 2033, so that the stay bar 100 is locked in the folded position, and the vehicle body can then run. In the folded position, the stay bar 100 is located adjacent the first bar 41 and extends parallel to the first bar 41, so as to reduce the space occupied by the stay bar 100. The first bar 41 may be further provided with a catch unit 500. When the stay bar 100 is in the folded position, an end portion of the stay bar 100 is caught by the catch unit 500, so as to further fasten the stay bar 100.

The connection segment 101 of the stay bar 100 preferably has a solid structure, for enhancing the strength of the stay bar 100; the brace segment 102 has a hollow structure, for reducing the weight. Thus, the stay bar 100 is provided in two segments, which not only ensures the strength at the connection portion, but also reduces the weight.

The second screw hole 1012 is for mounting a second resilient pin 600. The second resilient pin 600 comprises a connection cylinder 6001 connected with the second screw hole 1012, a sliding ball part 6002 with a spherical surface provided on the connection cylinder 6001, and a resilient part provided between the sliding ball part 6002 and the connection cylinder 6001. The spherical surface of the sliding ball part 6002 is arranged to protrude from the connection cylinder 6001 for abutting the first lug or the second lug.

The second resilient pin 600 is fixed in the second screw hole 1012 by means of an outer screw on the connection cylinder 6001. The spherical surface of the sliding ball part 6002 may be selected to abut the first lug, or may be selected to abut the second lug. During the rotation process of the stay bar 100, the second resilient pin 600 is arranged to always abut the first lug 202 or the second lug 203, so as to reduce oscillation for the rotation process of the stay bar 100.

Of course, the above described embodiments are preferred embodiments of the present invention. It should be noted that, for a person skilled in the art, various modifications and embellishments can be made without departing from the principle of the present invention, and these modifications and embellishments are also included within the protection scope of the present invention.

The invention claimed is:

1. An electrical self-balancing scooter, comprising:
   two wheels mounted on a wheel shaft, and
   a support frame located between the two wheels, wherein:
      the support frame comprises a bar mounted on the wheel shaft, with a handle part mounted on an upper end of the bar through a rotation mechanism, the rotation mechanism comprises a stator mounted on the bar and a rotor that is rotatable relative to the stator, the handle part is fixed on the rotor, and
      the rotation mechanism is provided with an angle measurement device to measure a rotation angle of the rotor.

2. The electrical self-balancing scooter according to claim 1, wherein:
   the rotation mechanism comprises a resilient torsion member having a plurality of locating holes on both upper and lower surfaces,
   the stator is provided with a chamber to receive the resilient torsion member as well as convex columns inside the chamber,
   the resilient torsion member is mounted to be received in the chamber with the convex columns of the stator inserted into the locating holes on the lower surface of the resilient torsion member, and
   the rotor is provided with convex columns to be inserted into the locating holes on the upper surface of the resilient torsion member, so that a rotation of the rotor forces the resilient torsion member to deform elastically.

3. The electrical self-balancing scooter according to claim 2, wherein, the rotor is mounted on the bar through a bearing.

4. The electrical self-balancing scooter according to claim 1, wherein the angle measurement device comprises a Hall sensor mounted on the rotor and a magnet mounted on the bar.

5. The electrical self-balancing scooter according to claim 1, wherein:
   the bar comprises a first bar connected to the wheel shaft and a second bar mounted on the first bar, and
   the handle part is mounted on an upper end of the second bar.

6. The electrical self-balancing scooter according to claim 5, wherein:
   a housing rotatable along with the handle part is provided outside the rotation mechanism,
   a lower part of the housing is mounted on the second bar in a rotatable manner through a sleeve member,
   the sleeve member is provided with an upper flange at an upper end and a lower flange at a lower end,
   the lower part of the housing is provided with a clamping groove to clamp the upper flange of the sleeve member, and
   a lower end of the housing is arranged to abut the lower flange of the sleeve member.

7. The electrical self-balancing scooter according to claim 5, further comprising an accommodation body located between the two wheels, wherein:
   the accommodation body comprises a first accommodation part and a second accommodation part on top of the first accommodation part,
   the first accommodation part comprises a side cover board,
   the second accommodation part comprises two partial cover boards,
   the two partial cover boards and the side cover board form a cylindrical or partially cylindrical accommodation space having a cylinder axis passing through the wheel shaft, and
   an opening is formed at a joint of the two partial cover boards for the first bar to pass through,
   the second accommodation part comprises a bottom plate and two semi-circle side plates located on both sides of the bottom plate, the bottom plate and the two side plates form a second accommodation space in a semi-cylindrical shape, and the two partial cover boards are located to cover the second accommodation space.

* * * * *